US012080929B2

(12) United States Patent
Stark et al.

(10) Patent No.: US 12,080,929 B2
(45) Date of Patent: Sep. 3, 2024

(54) SYSTEMS AND REACTORS FOR STORAGE OF ELECTRICAL ENERGY

(71) Applicant: ETH Zürich, Zürich (CH)

(72) Inventors: Wendelin Jan Stark, Langenthal (CH); Urs Benjamin Lustenberger, Zürich (CH)

(73) Assignee: ETH Zürich, Zürich (CH)

(*) Notice: Subject to any disclaimer, the term of this patent is extended or adjusted under 35 U.S.C. 154(b) by 561 days.

(21) Appl. No.: 17/433,355

(22) PCT Filed: Feb. 25, 2020

(86) PCT No.: PCT/EP2020/054844
§ 371 (c)(1),
(2) Date: Aug. 24, 2021

(87) PCT Pub. No.: WO2020/173907
PCT Pub. Date: Sep. 3, 2020

(65) Prior Publication Data
US 2022/0149415 A1 May 12, 2022

(30) Foreign Application Priority Data

Feb. 25, 2019 (EP) .................................... 19159192

(51) Int. Cl.
*H01M 8/18* (2006.01)
*C01B 3/10* (2006.01)
(Continued)

(52) U.S. Cl.
CPC ............... *H01M 8/186* (2013.01); *C01B 3/10* (2013.01); *C25B 15/081* (2021.01); *H01M 8/0656* (2013.01); *H01M 8/22* (2013.01)

(58) Field of Classification Search
CPC ...... H01M 8/186; H01M 8/0656; H01M 8/22; C01B 3/10; C01B 3/061; C25B 15/081
See application file for complete search history.

(56) References Cited

U.S. PATENT DOCUMENTS 5,840,270 A * 11/1998 Werth ..................... C01B 3/105
429/421
6,093,501 A * 7/2000 Werth ..................... C01B 3/10
429/421
(Continued)

FOREIGN PATENT DOCUMENTS

CN 201124095 10/2008
DE 102013106039 12/2014
(Continued)

OTHER PUBLICATIONS

Machine Translation of JP-4295515-B2 (Apr. 12, 2024) (Year: 2024).*

(Continued)

*Primary Examiner* — Matthew J Merkling
(74) *Attorney, Agent, or Firm* — Renner, Otto, Boisselle & Sklar, LLP

(57) ABSTRACT

The present invention relates to energy storage systems and reactors useful in such systems. Inventive reactors comprise a reaction vessel defining an inner volume and a compensation element, whereby said inner volume is filled with a fixed bed that is free of cavities and that comprises particles of formula (I), FeOx (I), where $0 \leq x \leq 1.5$; said compensation element is adapted to adjust said inner volume. The reactors are inherently explosion proof and thus suited for domestic use. The systems are useful for compensating long-term fluctuations observed in production of renewable energy.

13 Claims, 2 Drawing Sheets

Figure 1A:
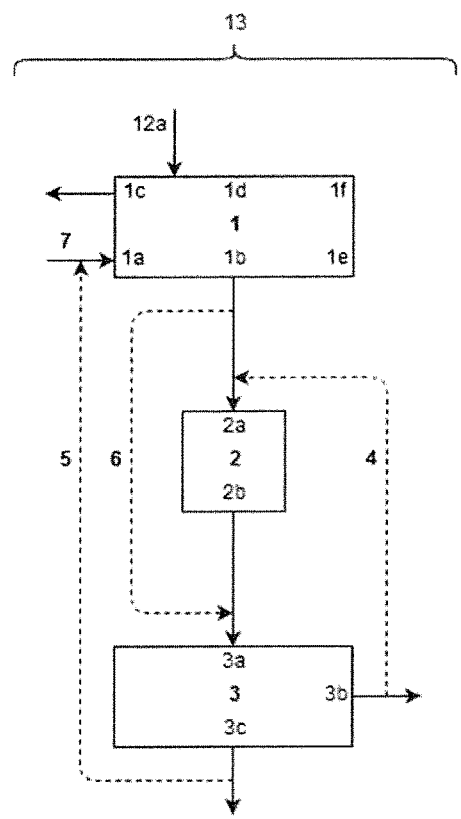

(51) Int. Cl.
  *C25B 15/08* (2006.01)
  *H01M 8/0656* (2016.01)
  *H01M 8/22* (2006.01)

(56) References Cited

U.S. PATENT DOCUMENTS

| | | | |
|---|---|---|---|
| 7,300,643 B2 | 11/2007 | Otsuka et al. | |
| 9,583,804 B2 | 2/2017 | Drenckhahn et al. | |
| 2002/0048548 A1* | 4/2002 | Chaklader | C01B 3/08 423/657 |
| 2005/0175533 A1* | 8/2005 | Thomas | C01B 3/50 423/657 |
| 2010/0212457 A1* | 8/2010 | Drnevich | F27D 17/008 266/144 |
| 2014/0227157 A1* | 8/2014 | Moghtaderi | B01D 53/72 423/245.3 |

FOREIGN PATENT DOCUMENTS

| | | | |
|---|---|---|---|
| DE | 102017201861 | 8/2018 | |
| JP | 4295515 B2 * | 7/2009 | ............. B01J 8/025 |
| WO | WO-9322044 A2 * | 11/1993 | ............. B60K 1/04 |

OTHER PUBLICATIONS

International Search Report and Written Opinion for corresponding International Patent Application No. PCT/EP2020/054844 mailed on May 26, 2020.

A. Pineau et al., "Kinetics of reduction of iron oxides by H2 Part II. Low temperature reduction of magnetite" Science Direct, Thermochimica Acta 456 (2007) pp. 75-78.

M. Selan et al., "Sponge iron: economic, ecological, technical and process-specific aspects", Journal of Power Sources 61 (1996) pp. 247-253.

\* cited by examiner

SYSTEMS AND REACTORS FOR STORAGE OF ELECTRICAL ENERGY

This application is a national phase of International Application No. PCT/EP2020/054844 filed Feb. 25, 2020, which claims priority to EP Application No. 19159192.4 filed on Feb. 25, 2019, the entire disclosures of which are hereby incorporated herein by reference.

SUMMARY

The present invention relates to energy storage systems and reactors useful in such systems. The reactors are inherently explosion—proof and thus suited for domestic use.

BACKGROUND

It is generally accepted that production and consumption of energy fluctuate; an electrical grid therefore needs to compensate short-term, mid-term and long-term fluctuations. Renewable power sources (e.g. photovoltaic power, wind power) heavily depend on weather conditions. Thus, production of renewable energy fluctuates on multiple time scales: hourly, daily, and seasonally. To maximize renewable energy production at all times, the temporal surplus between produced and consumed energy has to be stored for a certain time.

For example, energy generated by the photovoltaic system is used to satisfy the electric energy demand of one or more domestic homes. If more electric energy is produced than consumed, the electric energy is stored by charging a battery. Contrary, if less electric energy is produced than consumed, missing energy is provided by discharging the battery. If the battery is fully charged, such as during the summer season, surplus energy is fed to the grid, usually for no or only small revenue. If the battery is fully discharged, such as during the winter season, missing energy is purchased from the grid at a comparably high price. Instead of selling and buying energy for unfavourable prices, it would be beneficial to store the surplus energy generated during an entire season and release it during another season of the year. Therefore, the capacity of a seasonal energy storage system needs to be significantly bigger than the capacity of a daily energy storage system. In this context, it is important to notice that next to significant costs, rechargeable battery systems are often prone to slow discharge if stored over half a year, such as needed for seasonal energy storage.

Energy storage systems using the redox pair $Fe_3O_4$/Fe are known and described in DE10 2017 201 861. The systems disclosed in that document are complicated and require movement of solid material (Fe/$Fe_3O_4$) from storage devices to reactors and solid-gas separators. Such systems require a high level of maintenance and/or are prone to malfunction and thus less suited for domestic purposes. Further, the system contains hydrogen and inherently bears the risk of an explosive incident. Such risk requires additional measures and is often not acceptable to customers, particularly in domestic applications.

The redox pair iron oxide/iron and its use for storing energy is known and well investigated. For example, Selan et al (J. of Power Sources 61, 1995, 247) examine the process cycle sponge iron/hydrogen/iron oxide. According to the authors, the cycle offers a simple possibility to store the energy of synthesis gases in the form of sponge iron. Further, Pineau et al (Thermochimica acta, 456, 2007, 75) study kinetics of reduction of iron oxides by hydrogen. Both documents fail to disclose any specific teaching for energy storage systems.

In consequence, there is a need for further, particularly improved, energy storage systems.

Thus, it is an object of the present invention to mitigate at least some of these drawbacks of the state of the art. In particular, it is an aim of the present invention to provide energy storage systems that are more reliable and/or safer than known systems.

These objectives are achieved by the system as defined in claim 6 and reactors adapted to such systems as defined in claim 1. Further aspects of the invention are disclosed in the specification and independent claims, preferred embodiments are disclosed in the specification and the dependent claims.

DESCRIPTION OF THE INVENTION

The present invention will be described in more detail below. It is understood that the various embodiments, preferences and ranges as provided/disclosed in this specification may be combined at will. Further, depending of the specific embodiment, selected definitions, embodiments or ranges may not apply.

Unless otherwise stated, the following definitions shall apply in this specification:

As used herein, the term "a", "an", "the" and similar terms used in the context of the present invention (especially in the context of the claims) are to be construed to cover both the singular and plural unless otherwise indicated herein or clearly contradicted by the context. As used herein, the term "containing" shall include "comprising", "essentially consisting of" and "consisting of".

The term "fixed bed", also termed "packed bed", is known in the field. It particularly denotes a packing material stationary and immovable located within a reactor vessel. Fixed beds are not agitated by a high mass flow of a fluid or by a stirring device and thus distinguish from a fluidized bed or a moving bed. The packing material of the fixed bed is adapted for allowing one or more fluids passing through the bed thereby allowing a chemical reaction. Suitable packing materials include particles (such as powders, granules and the like) shaped articles (such as Raschig rings) and structured packings. Fixed beds may be characterized by inter-particle porosity, intra-particle porosity and total porosity, c.f FIG. 4. Porosity may be determined by standard methods, particularly as described below.

The term "particle" is known in the field. It particularly denotes a material in a specific form that stays together under a given mechanical treatment. Particles may be characterized by its appearance (including porous, non-porous, granular), the particle size, particle size distribution, porosity, density and specific surface area. Particles can be solid, that means they exclusively consist of a solid and have a well-defined, continuous outer surface without openings or pores. The whole particle volume is filled with material. Typical examples of solid particles are particles as they result from solidification of droplets from a molten material, such as glass, wax or metals. The surface tension of these materials tries to create particles with minimal surface and closes openings and pores during the fabrication process. The particle density ($\rho\_part$) of a solid particle is therefore equal to the material density ($\rho\_mat$) of the solid material that composes the particle.

For solid particles, the particle volume can be obtained from the particle mass and the material's density. Densities for typical materials are tabulated properties and depend on the materials chemical composition.

Particles can also be porous. The volume of a porous particle is filled with solid material and with void space. Porous particles can have at least one closed void within their interior (non-accessible empty space within the solid), or they have at least one opening or pore in their outer surface. Porous particles are typically a result from a drying process or a mechanical treatment where components of the porous particles are brought together and then form a particle (granules).

To distinguish between open space (a part of space that is not filled with a solid) between particles and within a particle, the concept of inter-particle and intra-particle porosity is used.

Inter-particle porosity (=voidage, bed porosity), $\varepsilon\_bed$: The space between solid particles expressed as a percentage or fraction of the total volume. The inter-particle porosity of a fixed bed is used to indicate the available space for the flow of fluid for chemical reaction. The inter-particle porosity of a fixed bed is the ratio of the volume of voids between particles to the total volume of the bed. The value is dependent on the shape and size distribution of the particles, the ratio of the particle size to bed diameter, and the method used for filling the bed. The volume of the voids is the volume of the bed minus the volume of the particles. For spheres of uniform size, the range of attainable porosities is given by ordered packings with values from 0.26 (rhombohedral packing) to 0.48 (cubic packing). Disordered or random packings of spheres typically range from 0.44 (very loose random packing) to 0.36 (close random packing).

The volume of particles ($V\_part$) can be calculated using the particle size and shape, that can be determined using optical methods, such as light or electron microscopy. For spherical particles, the calculation of the volume is straightforward ($V\_part=4/3 \cdot pi \cdot r^3$; with r being the radius of the particle, pi being 3.14), for ill-shaped particles, approximations are typically used, the most frequent one uses a mean diameter of several measurements to get a mean radius ($r=d/2$).

For porous particles, the volume of the particle includes possible voids inside the particle, or pores. For clarity, a porous particle's mass will be less than the particle's volume multiplied by the materials density ($\rho\_mat$), since the void or pores typically have a much lower density.

For particles that are pigments, the DIN Norm EN ISP 8130-13 describes the use of laser scattering for particle size determination. It typically delivers a mean size that can be used to calculate a mean particle volume. The method is advantageous for micron sized materials (particle size in the range of 1 to 50 micrometer). For larger particles (more than 50 micrometer) sieve analysis is often used. The inter-particle porosity can be determined using the bed density ($\rho\_bed=m\_bed/V\_bed$), the particle density ($\rho\_part=m\_part/V\_part$) and the density of the fluid saturating the voids ($\rho\_fluid$):

$$\varepsilon\_bed=(\rho\_part-\rho\_bed)/(\rho\_part-\rho\_fluid)$$

Intra-particle porosity (=porosity), $\varepsilon\_part$: The proportion of the volume of a porous particle that is not occupied by the solid itself. It is usually given as a fraction, percentage, or decimal. Gravel have typically a low or negligible fraction of voids, while saw dust or dry soil has a lot of pores or voids. The intra-particle porosity can be determined using the particle density ($\rho\_part=m\_part/V\_part$), the material density ($\rho\_mat$) and the density of the fluid saturating the voids ($\rho\_fluid$):

$$\varepsilon\_part=(\rho\_mat-\rho\_part)/(\rho\_mat-\rho\_fluid)$$

Total porosity $\varepsilon\_tot$: The proportion of the volume of the fixed bed that is not occupied by the solid, dense material. The total porosity can be determined using the bed density ($\rho\_bed=m\_bed/V\_bed$), the material density ($\rho\_mat$) and the density of the fluid saturating the voids ($\rho\_fluid$):

$$\varepsilon\_tot=(\rho\_mat-\rho\_bed)/(\rho\_mat-\rho\_fluid)$$

Theoretically, the total porosity is the combination of intra-particle porosity and inter-particle porosity and these porosities are related as follows:

$$\varepsilon\_tot=(V\_bed \cdot \varepsilon\_bed + V\_bed \cdot (1-\varepsilon\_bed) \cdot \varepsilon\_part)/V\_bed=\varepsilon\_bed+\varepsilon\_part-\varepsilon\_bed \cdot \varepsilon\_part$$

Multiple experimental techniques for determining characteristics of porous materials exist. Gas sorption with nitrogen is used for measurements involving pore diameters in the range form 0.4-300 nm (Klobes et al., 2006). Liquid intrusion by a non-wetting liquid (i.e. mercury porosimetry) is widely accepted for scales above 4 nm, particularly between 4 nm and 60 µm. (Espinal, 2012). Suitable particles in the context of this invention are particularly of diameter 0.01 µm-1.0 µm (as defined by the above norm) and/or 2-80 $m^2/g$ surface area.

Figure 1B:
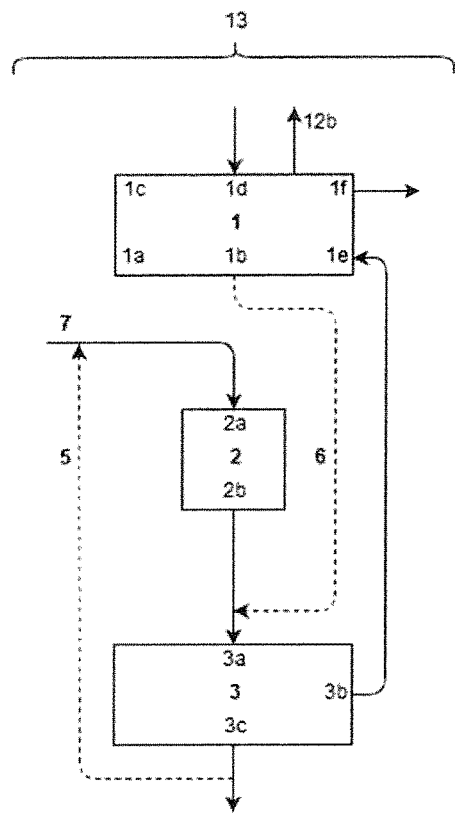
Figure 2A:
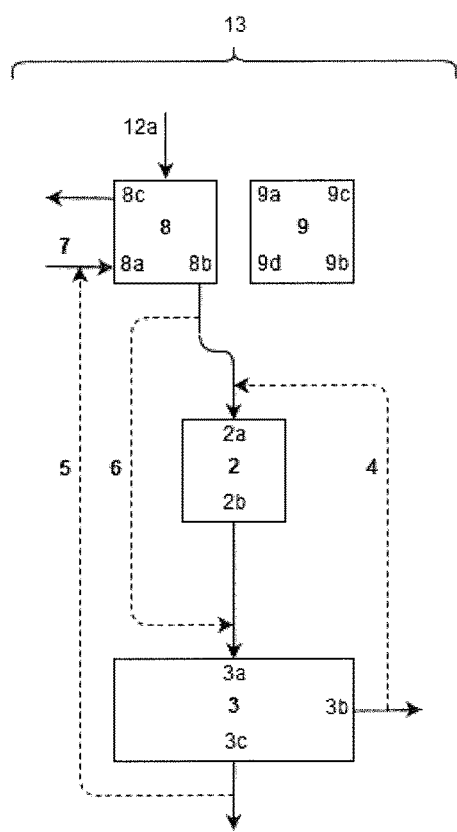
Figure 2B:
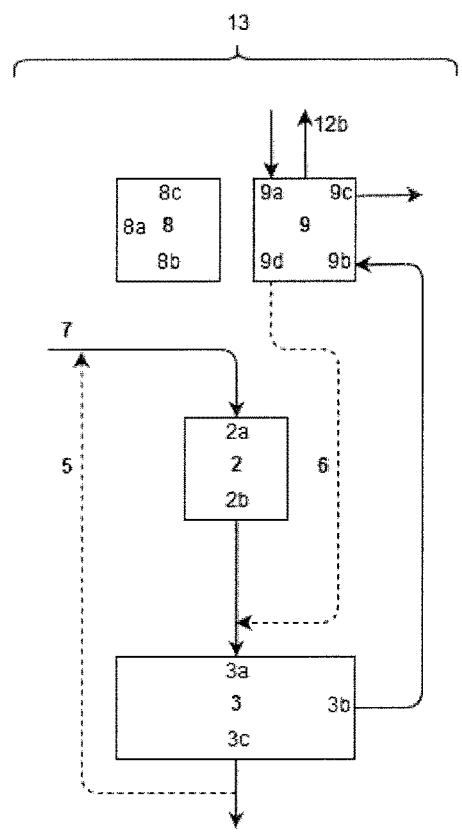
Figure 3A:
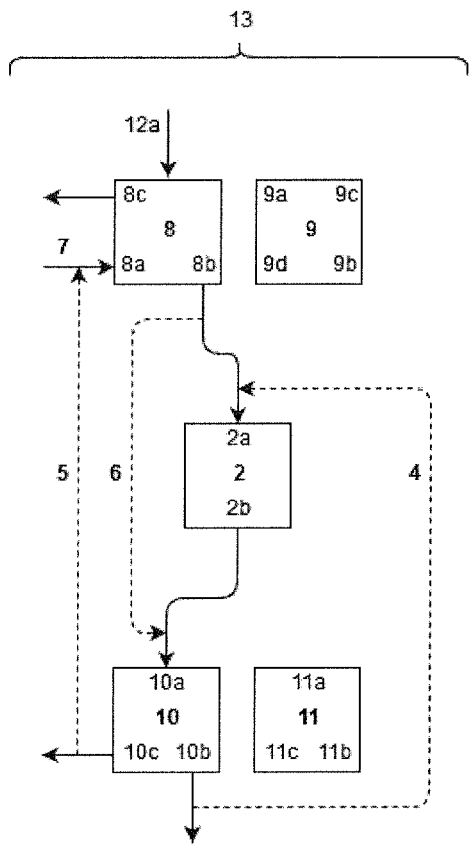
Figure 3B:
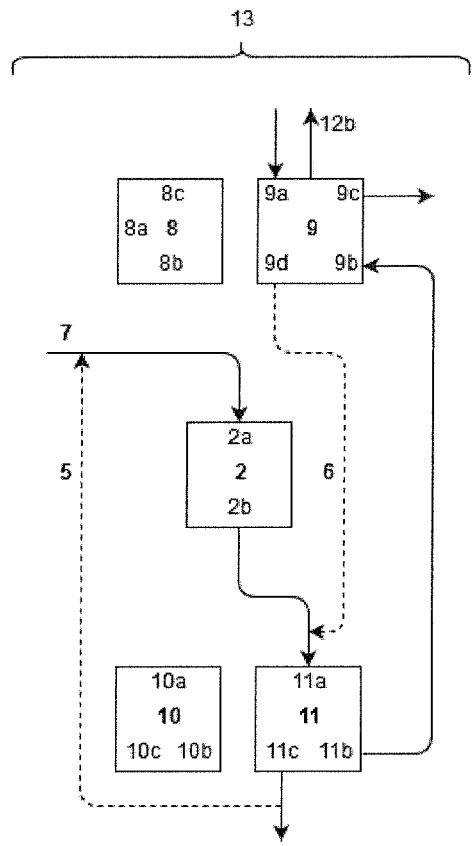
Figure 4A:
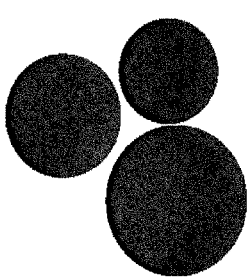
Figure 4B:
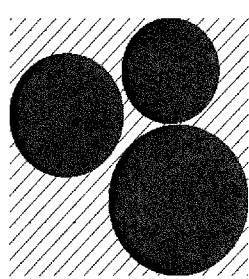

The present invention will be better understood by reference to the figures where FIGS. 1A, 2A and 3A show charging mode, while FIGS. 1B, 2B and 3B show discharging mode of the inventive systems.

LIST OF REFERENCES

1 Reversible fuel cell
1a Water inlet,
1b Hydrogen outlet,
1c Water/oxygen outlet,
1d Air inlet,
1e Hydrogen inlet
1f Water/air outlet
2 Reactor
2a Reactor inlet; 2b Reactor outlet
3 Hydrogen-water separator
3a Separator inlet,
3b Hydrogen-rich phase outlet,
3c Water-rich phase outlet
8 Electrolyzer
8a Water inlet,
8b Hydrogen outlet,
8c Water/oxygen outlet
9 Fuel cell
9a Air inlet,
9b Hydrogen inlet,
9c Water/air outlet,
9d Hydrogen outlet
10 Hydrogen-water separator for charging
10a Separator inlet,
10b Hydrogen-rich phase outlet,
10c Water-rich phase outlet
11 Hydrogen-water separator for discharging
11a Separator inlet,
11b Hydrogen-rich phase outlet,
11c Water-rich phase outlet
4 Hydrogen recycle
5 Water recycle
6 Purification of hydrogen
7 Water feed
12a Power input (charging), 12b Power output (discharging)
13 Energy storage system FIG. 1 shows a first embodiment of the inventive system, comprising a reactor (2) as described herein, a reversible fuel cell (1) and a Hydrogen-Water Separator (3). In charging mode according to FIG. 1A, power input (12a) is in operation and allows reduction reaction in reactor (2) as described herein. In discharging mode according to FIG. 1B, power output (12b) is in operation driven by oxidation reaction in reactor (2) as described herein.

FIG. 2 shows a second embodiment of the inventive system, comprising a reactor (2) as described herein, and a Hydrogen-Water Separator (3). In this second embodiment, reversible fuel cell is replaced by an electrolyzer (8) and a fuel cell (9) when compared to the first embodiment. In charging mode according to FIG. 2A, power input (12a) is in operation and allows reduction reaction in reactor (2) as described herein; fuel cell (9) is not in operation. In discharging mode according to FIG. 2B, power output (12b) is in operation driven by oxidation reaction in reactor (2) and fuel cell (9). Electrolyzer (8) is not in operation.

FIG. 3 shows a third embodiment of the inventive system, comprising a reactor (2) as described herein, an electrolyzer (8) and a fuel cell (9). In this third embodiment, the Hydrogen-Water Separator (3) is replaced by an Hydrogen-Water separator for charging (10) and a Hydrogen-Water separator for discharging (11) when compared to the second embodiment. In charging mode according to FIG. 3A, power input (12a) is in operation and allows reduction reaction in reactor (2) as described herein; fuel cell (9) and separator (11) are not in operation. In discharging mode according to FIG. 3B, power output (12b) is in operation driven by oxidation reaction in reactor (2) and fuel cell (9). Electrolyzer (8) and separator (10) are not in operation.

Figure 4C:
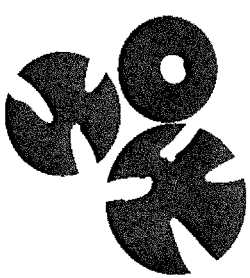
Figure 4D:
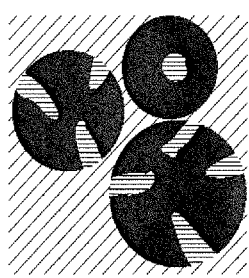

FIG. 4 shows solid particles (FIG. 4A), the interparticle volume for solid particles (FIG. 4B, hatched), porous particles (FIG. 4C), the intraparticle volume (hatched differently) and interparticle volume for porous particles (FIG. 4D).

Figure 5A:
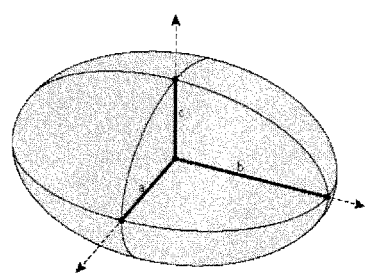
Figure 5B:
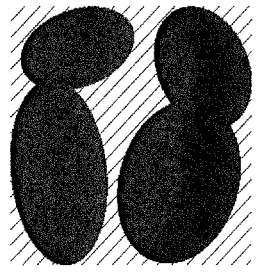
Figure 5C:
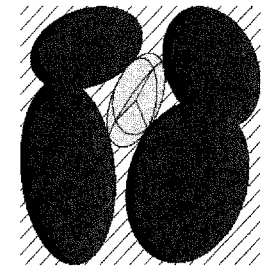

FIG. 5 shows how the size of a cavity is assessed. FIG. 5A presents a generic ellipsoid and its three principal radii a, b and c. FIG. 5B shows solid material and a cavity. FIG. 5C solid material, a cavity and the biggest ellipsoid that fits into the cavity.

In more general terms, in a first aspect, the invention relates to a specific reactor 2 comprising a reaction vessel 2c defining an inner volume, a compensation element 2d, an inlet and an outlet 2a, 2b, a heating element 2e, and an insulation 2f, characterized in that said inner volume is filled with a fixed bed and said compensation element is adapted to adjust said inner volume. Said fixed bed is (i) free of large cavities as defined further detail below. Further, said fixed bed contains or consists of particles of formula (I), FeOx (I), where 0≤x≤1.5 as defined in further detail below. The inventive reactor 2 allows the conversion of hydrogen to water (thereby capturing the thus obtained chemical energy) and its reverse reaction (thereby releasing hydrogen). The reactor is inherently explosion-proof, making it suitable for domestic applications. This aspect of the invention shall be explained in further detail below:

Reactor 2: A reactor is a unit able to perform a chemical reaction, particularly reduction and oxidation of FeOx (I) as discussed herein. The inventive reactor comprises a number of elements, particularly a reaction vessel, one or more compensation elements, one or more inlets and outlets, one or more heating elements, an insulation. Further elements may be present. The skilled person is familiar with equipping a reactor with all elements necessary to perform the reaction described herein and to integrate the reactor in a system as described herein ($2^{nd}$ aspect). The skilled person is also familiar with selecting materials adapted to the reaction conditions described herein. Requirements for reactor materials comprise long-term stability at high-temperatures during exposure to hydrogen and/or steam. Suitable materials for the reactor vessel include austenitic stainless steels with an enhanced corrosion resistance and low potential hydrogen damage, such as such as type 316L (1.4404) and type 316Ti (1.4571). Suitable seal materials include expanded graphite sheet. As outlined below, the reactor is operated at ambient pressure and temperatures in the range of 500° C. Accordingly, reactor 2, particularly reaction vessel 2c, is adapted to pressures below 2 bar and temperatures below 1000° C.

Reaction vessel 2c: The inner volume of the reaction vessel may vary over a broad range, suitable are 1-10 m³.

The shape of the reaction vessel may be generally any shape known in the art; its design is particularly driven considering isolation and heating as well as manufacturing. Suitable are reaction vessels in the form of a cylinder or a sphere or a tube bundle, preferably a cylinder. Preferably, the outer geometry of the reactor vessel is simple, e.g. cylindrical or cuboid, and has a low surface to volume ratio to minimize heat losses.

As outlined herein, the reaction vessel is filled with particles of formula (I) in the form of a fixed bed. Accordingly, there is no need to include means for agitation and/or for transportation. This is considered particularly advantageous, as it makes the reactor more robust and particularly useful in household applications. In one embodiment, the fixed bed consists of particles of formula (I) in the form of a compacted powder, such as pellets. The compacted powder may be shaped in a way to enhance convective transport of mass and/or heat within the fixed bed.

In one embodiment, the fixed bed is structured in a way to enhance convective transport of mass and(/or) heat within the fixed bed.

Compensation element 2d: One or more compensation elements are included. The term describes an element to compensates a change in volume (compaction/expansion=breathing) of the fixed bed during the process. Accordingly, said compensation element is capable to adjust said inner volume. During the reaction described below, particles of formula (I) are oxidized or reduced. As a consequence thereof particle size changes. To ensure the inner volume is free of cavities, the compensation element(s) are implemented. Accordingly, the compensation element(s) are adapted to compensate volume dilatation/compression during operation of the reactor. Such compensation element(s) are known per se; they may be configured in the form of a membrane or in the form of a piston or in the form of a sponge or in the form of fibrous material. Suitable fibrous materials are known and include inorganic materials obtained by spinning or drawing molten mineral or rock materials. Examples of such fibrous materials include mineral wool such as commercially available stone wool, slag wool, and glass wool.

Inlet, Outlet 2a, 2b: In- and Outlet are elements, adapted to fill and remove gases from said inner volume. Further, they are adapted to retain particulate material within the reactor vessel. Commercial valves may be used. It is apparent that such in- and outlet are in fluid communication with further units of the system described below. Depending on the operation mode, in- and outlet may exchange its function, i.e. inlet in charging mode and outlet in discharging mode. Typically, in- and outlet are positioned at opposite sides of the reactor, such as at the top and at the bottom of the reactor 2.

Heating Element 2e: Heating of the fixed bed is to attain and maintain the specified temperatures of the charging and discharging process. Internal heaters may be used; they directly provide thermal energy to the fixed bed. Alternatively or additionally, external heaters may be used; they provide energy to the reactor vessel or the fluid entering the reactor.

The temperature of the charging reaction and the temperature of the discharging reaction are subject to multiple criteria. Lower temperatures are of advantage regarding heat loss of the system and ageing of the oxygen carrier material, while reaction kinetics are enhanced at higher temperatures. Regarding thermodynamic equilibrium between the reacting atmosphere and the solid oxygen carrier material, higher temperatures are favoured during the charging process and lower temperatures are favoured during the discharging process. Suitable ranges include:

Charging: 200° C.-450° C., preferably 200° C.-400° C., most preferably 200° C.-350° C.

Discharging: 150° C.-400° C., preferably 150° C.-350° C., most preferably 150° C.-300° C.

Insulation 2f: The reactor 2 comprises a thermal insulation; such insulations are known per se. Thermal insulation of the reactor vessel reduces the amount of heating energy that has to be provided to the reactor. Requirements for insulations are low thermal conductivity and long-term stability at the respective temperatures. Suitable insulations include rock wool and/or vacuum chambers.

Further elements: The reactor may, as discussed above, comprise one or more additional elements.

In one embodiment, sensing elements, such as temperature and/or pressure sensors, are included.

In one embodiment, a gas tank in fluid communication with said reaction vessel is included. Such gas tank may contain an inert gas (e.g. nitrogen gas) to adjust gas pressure and volume during operation.

In one embodiment, the reactor is equipped with a heat exchanger. The amount of required heating energy can be reduced by heat recovery. For example, a stream entering the reactor can be heated by a stream leaving the reactor in a heat exchanger.

Particles of formula (I): Formula (I) encompasses iron in oxidation state $+/-0$, $+2$ and $+3$ and consequently idealized formulae:

| Fe | (Ia), x = 0, | $Fe^{+/-0}$ |
|---|---|---|
| $FeO = FeO_1$ | (Ib); x = 1, | $Fe^{+2}$ |
| $Fe_3O_4 = FeO_{4/3}$ | (Ic); x = 4/3, | $Fe^{+2}$ and $Fe^{+3}$ |
| $Fe_2O_3 = FeO_{3/2}$ | (Id), x = 1.5, | $Fe^{+3}$. |

The above formula (I) also includes non-stochiometric compounds, such as wüstit ($Fe_{1-z}O$, $z<1$) and mixtures of these compounds. Phase diagrams showing stability of iron oxides at various temperatures are known.

The above formula (I) further includes hydrates of the compounds of formula (I). For example, $Fe(OH)_2 = FeOx$ $H_2O$ shall be covered by formula (Ib); similarly, $Fe_2O_3 \times nH_2O$ is covered by $FeO_{3/2}$.

The above particles may be doped or mixed with other elements, which enhance the oxygen carrier's stability towards sintering and/or promote its reduction reaction and/or promote its oxidation reaction under process conditions. Such dopants are preferably present in an amount of 0-30%, more preferably 0-10% most preferably 0-3%. Examples of such dopants include Ce, W, Mo, Cr, Al, Si, Ca, Mg, Ti, V, Mn, Ni, Co, Cu, Pd, Pt, Rh, Zr, Y, Gd, Zn in metallic or any of their oxidized forms.

Particles of formula (I) are available from many natural and synthetic sources. Such particles are commercial items, and available for example as pigments from various suppliers.

The reactor may be charged either with iron oxide (the usually preferred way), since latter is an easy to handle material (not inflammable).

In some embodiments, it is preferred to charge a new reactor (upon delivery to the client) with pre-reduced iron oxide, or with iron metal particles. Such charged reactors may be delivered if installed in fall or winter, and enable a household or customer to directly start using energy from the system.

Cavity-free filling: Particles of formula (I) essentially fill the above described inner volume of reaction vessel 2c. Accordingly, the fixed bed makes up at least 90%, preferably at least 95%, much preferably at least 98% of said inner volume. The remaining volume may be occupied by other elements of the reactor, for example structuring, stabilizing or heating elements.

As discussed above, the fixed bed, comprising or consisting of particles of formula (I), is free of large cavities. The term cavity denotes a space within the reactor volume that does not contain particles of formula (I). Such cavities are defined (i) by a maximum volume and (ii) a maximum length. The volume of a cavity is the volume of the biggest ellipsoid that fits into the cavity. The volume of an ellipsoid is $V_{cavity} = V_{ellipsoid} = 4/3 \cdot \pi \cdot a \cdot b \cdot c$, where a, b, and c are the three principal radii of the ellipsoid.

In one embodiment, no cavities are present (i) where $V_{ellipsoid}$ is larger than $V_{max} = 10000$ mm³, while (ii) all three principal radii describing this volume are at least $c_{min} = 3$ mm. Given the above formula the maximum extension of a cavity is below a=b=3 mm and c=265 mm.

In one further embodiment, no cavities are present (i) where $V_{ellipsoid}$ is larger than $V_{max} = 2000$ mm³, while (ii) all three principal radii describing this volume at least 3 mm.

Due to this cavity-free filling of the reactor, accumulation of hydrogen is prevented. The reactor is thereby inherently explosion-proof. This is a significant advantage over the prior art, as no specific safety measures have to be taken. The reactor is thereby fit for domestic use.

Further considerations and embodiments of the reactor 2 are outlined below:

In one embodiment, the reaction vessel 2c is divided into two or more sectors, thereby defining two or more inner volumes, spatially separated from each other. In such embodiment, it is preferred that each of said section comprises a temperature sensor and a heating element. This allows for an inhomogeneous temperature distribution inside the reactor, with therefore reduced heat loss, as only a fraction of the reactor's wall will be at high temperature. Such arrangement is advantageous since maintaining the whole reactor at high temperature favours aging (particularly sintering) of compounds of formula (I). The lifetime of a reactor with sectors, independently heated, is longer than a reactor where all content is kept at operating temperature. Depending on the size and application, it may be preferred to make a simple most reactor with only a few sensors and one or a few heating elements, or a segmented reactor, with more sensors and heating elements.

In one further embodiment, the reaction vessel 2c is in fluid communication with a gas ballast of inert gas. Implementing such element is a further safety measure. The use of at least one inert gas containing element, typically a pressurized gas cylinder filled with argon or nitrogen, in connection to the reactor's inner volume, and controlled by at least one pressure measuring element. This inert gas containing element can be used in emergency situations to balance pressure reduction inside the reactor as a result of cooling (e.g. if the reactor is switched from hydrogen storage to hydrogen release, where the latter is often at lower temperature), or if the reactor is shut down (e.g. for maintenance or control). Pressure reductions inside can also be the result of hydrogen absorption through reaction with the iron oxide if latter is substoichiometric, and the amount of steam is not equal to the amount of absorbed hydrogen. In most cases, two (one redundant) nitrogen filled gas cylinders will be used, and during maintenance of the system, such nitrogen may be recharged. During normal operation, the injection of inert gas is not preferred as it dilutes the hydrogen and remains inactive inside the fuel cell.

In a second aspect, the invention relates to an energy storage system 13 adapted to convert electrical energy into chemical energy and storing the same ("charging") and its reverse process ("discharging"). Key unit of such system 13 is a reactor 2 as described herein. The inventive systems are useful for compensating long-term fluctuations observed in production of renewable energy. This aspect and various embodiments of this system shall be explained in further detail below:

In one embodiment, c.f. FIG. 1, the invention provides for an energy storage system 13 comprising a reactor 2 as described herein, said reactor being in fluid communication with a unit operating as a reversible fuel cell 1 and a unit separating water from hydrogen 3. These three units—reactor 2, reversible fuel cell 1 and hydrogen separator 3—are considered essential elements of the inventive energy storage system.

In advanced embodiments of the inventive system, these units 1, 2, and 3 are split into separate units (e.g. unit 1 into units 8 and 9; unit 3 into units 10 and 11) or the units are equipped with further elements, as described in further detail herein.

In one further embodiment, c.f. FIG. 2, the invention provides for an energy storage system 13 comprising a reactor 2 as described herein, said reactor being in fluid communication with an electrolyzer 8 and a unit separating water from hydrogen 3. Said unit 3 in turn being in fluid communication with a fuel cell 9.

It is apparent that according to this embodiment, said reversible fuel cell 1 is replaced by an electrolyzer 8 and a fuel cell 9.

In one further embodiment, not shown in the figures, the invention provides for an energy storage system 13 comprising a reactor 2 as described herein, said reactor being in fluid communication with a first separating unit 10 during charging mode and in fluid communication with a second separating unit 11 during discharging mode.

It is apparent that according to this embodiment, said separating unit 3 is replaced by a first separating unit 8 (in operation during charging) and a second separating unit 9 for (in operation during discharging).

In one further embodiment, c.f. FIG. 4, the invention provides for an energy storage system 13 comprising a reactor 2 as described herein, said reactor 2 being in fluid communication with an electrolyzer 8 and a first separating unit 10 during charging mode and said reactor 2 being in fluid communication with an a second separating unit 11, which in turn is in fluid communication with a fuel cell 9 during discharging mode.

It is apparent that according to this embodiment, said reversible fuel cell 1 is replaced by an electrolyzer 8 and a fuel cell 9. Further, said separating unit 3 is replaced by a first separating unit 8 for charging and a second separating unit 9 for discharging mode In one further embodiment, not shown in the figures, a water-hydrogen separating unit 3' is integrated within the reactor 2. This may be implemented by a storage element ("chamber"), said storage element being located within the reactor and said storage element comprising a microporous and hygroscopic material (II). Suitable materials (II) include zeolites. Such unit 3' may replace unit 3, 10 or 11 or be implemented in addition to either of the afore-mentioned units.

The above units, except reactor 2, are known per se and may be scaled and/or adapted by the skilled person to comply with the uses described herein. Further details on these units is provided below:

A reactor 2 is a unit described above, first aspect of the invention.

A hydrogen water separator 3, 10, 11 is a unit able to separate the two components. Such units are known and include condensators and desiccators.

The conversion of hydrogen to water during the charging process is thermodynamically limited, i.e. the stream leaving the reactor contains both, hydrogen and water. Recycling of unreacted hydrogen to the reactor (4 in FIGS. 1, 2 and 3) requires removal of water in a separator (3, 10, 11 in FIGS. 1, 2 and 3).

Established methods for the separation of water and hydrogen include condensation of water, adsorption of water in a desiccator, and membrane separation. Depending on the detailed locally available media and characteristics (water, heating sources, size of installed photovoltaics, season, geographic location), different techniques are preferred:

a) Condensation type separators: In areas with abundant cooling water or in cold climates, condensation type separators for water and hydrogen can be the most cost effective solution. In locations where heat is easily available, absorber based separation of water and hydrogen may be the best option. Such systems can operate over a broad range of temperature, depending on the type of absorber. Silica gels for example are useful at conditions starting at 50 degree Celsius and may be operated up to above 200 degree Celsius. Zeolite and molecular sieve based systems typically require higher water desorption temperature. This is advantageous, however, since the water rich hydrogen stream leaving the reactor is at elevated temperature, and in an ideal case, the water/hydrogen separation happens at a similar or the same temperature, thus essentially operating isothermal. This is much preferred as essentially not cooling down and re-heating of the hydrogen stream is needed. In some instances, membranes may be used to separate the hydrogen/water stream. Membranes are of interest when space constraints are important in the design of the specific form of the invention described here.

b) Desiccator: A desiccator is a vessel filled with a fixed bed, through which the mixture to separate can flow. The fixed bed consists of at least one material of the group of water adsorbing materials. The group of water adsorbing materials includes zeolites (molecular sieves), silica gel and activated alumina.

The desiccator can be included within the here described vessel, i.e. it can be occupying part of the inner volume of the reactor. Such arrangements are of interest due to safety constraints, as all hydrogen handling is done within a clearly defined, well shielded area. Moreover, heat loss due to additional walls and pipes is reduced. Therefore, desiccators located inside the reactor, or directly adjacent with a significant contact area to the reactor, such as a common wall, are often preferred. In such arrangement, valves may be located outside of the reactor, to reduce the heat stress on such more sensitive equipment. Desiccators operate at two temperatures, at least, a first temperature (the lower one) where water is removed and the hydrogen system is dried, and a second temperature (the higher temperature) where water is leaving the desiccator and the desiccator's material is regenerated (dried). In addition to the above described temperature-swing-operation, other desiccators are known that run in pressure-swing- or pressure-temperature-swing-operation. Application of such desiccators is generally feasible, however temperature-swing systems are considered to be simpler and therefore more preferred.

In lieu of one single separator 3, a first and a second separator 10, 11 may be present. The first separator 10 removes $H_2O$ from the stream which leaves the reactor during charging. The separation could be based on a molecular sieve taking up water, or a membrane with a higher permeability for one of the gases, or on condensation of steam. The second separator 11 splits the stream, which leaves the reactor during discharging, into a stream of higher hydrogen fraction and a stream of lower hydrogen fraction. The separation could be based on a molecular sieve taking up water (operated in swing mode), or a membrane with a higher permeability for one of the gases, or on condensation of steam.

A reversible fuel cell 1 is a unit combining the function of a fuel cell and of an electrolyzer. Such reversible fuel cells are commercial items or may be manufactured according to known methods.

A Fuel cell 9 is an electrochemical generator wherein the reactants are supplied from outside. According to this invention, hydrogen is combined with air to produce electrical energy. Fuel cells are commercial items. Suitable are, for example PEM fuel cells.

An Electrolyzer 8 is a unit cleaving water into oxygen and hydrogen, thereby consuming electrical energy. Electrolyzers are commercial items. Suitable are, for example PEM (proton-exchange membrane) electrolyzers.

In addition to the units describe above, the inventive system 13 may be combined with further units, particularly to increase efficiency and/or safety. Fluid communication between the units is enabled by piping systems, including pipes, valves, and sensors, as conventional in the field. As mentioned above, reactants hydrogen, water and air move through the various units of the inventive system, the compound of formula (I) is not transported and remains within reactor 2. This is a substantial advantage over systems known from DE 10 2017 201 861.

Embedding of the system: In one embodiment, one or more heat consuming or producing elements of the present system 13 are connected to the water handling circuit of a house. This allows either use of a household's water circuit as a cooling source, or, it permits near instantaneous heating capability to a household since the here described reactors are large and can serve as heat buffers to the otherwise discontinuous use of warm water in a household. Such near instantaneous heating systems for water are considered a superior solution to the today broadly used storage of warm water in tanks, as the overall (integrated) heat loss is lower if warm water is made on the spot, when needed.

The system is electrically connectable or connected, particularly to a local energy management system, via power in- and output 12a, 12b. Power input 12a may be an electrical connection to a photovoltaic system. Power output 12b may be connection to an AC/DC converter. Said local energy management system may be connected to the electric grid.

Pumps, compressors: Further, a pump or a compressor may enable flow of hydrogen for hydrogen recycling. The separated water can be stored to be used in the discharging step. Alternatively, it can also be used in the fuel cell during the charging step. The reuse of water inside the system is often preferred since the invention's component typically need water of high purity. Further, a pump or a compressor may enable the flow required for water recycling. The separated hydrogen can be used in the electrolyzer. Hydrogen compressors or pumps are commercially available in the form of membrane pumps, rotary pumps, piston pumps and others. Since only low pressure differences are used in the here described systems, rotary and membrane pumps are suitable. Preferably, the pump is encapsulated with a gas impermeable shell, rendering hydrogen release improbable.

Measurement/Control System: The here described energy storage system typically requires a control unit, either containing a computer or a microcontroller. In some cases, also a remote controlled option using a data transmission may be used. Whilst controllers are known to the person skilled in the art, the here described system neet at least one pressure controller, at least one temperature measurement in the reactor. Usually, several temperature measurements will be used to get a better control of the reactors inner temperature distribution.

Safety: The inventive system benefits from improved safety, this shall be explained in further detail: As a first safety measure, the reactor and associated units/elements, such as water separator or valves and sensors are best arranged in a way to minimize tube length, number of connectors and the area of the outer wall, separating the hydrogen containing parts from the outside (air). While later is common standard in good engineering praxis, the inside of the reactor is characterized by the fact that it is essentially full, as described above. A second safety measure is the very low pressure under which the inventive system operates. The reactor operates essentially at atmospheric conditions, thus reducing outflow (pressure is slightly higher than atmospheric pressure of the air outside) of hydrogen in case of a leak, or inflow of air (if the reactor is at a lower pressure than the atmosphere outside). In both cases, dangerous mixtures of hydrogen and air could result in flames or explosions. This second safety measure is further beneficial to the reactor weight and manufacturing costs, as thinner walls can be used, with lower overall metal requirement. A third (optional) safety measure is the use of at least one element containing an inert gas and being in fluid communication with the reactors inner volume, as described above. A forth safety measure is absence of moving elements (with the exception of the compensation element 2d and pumps/compressors.

In a third aspect, the invention relates to the use of reactors and systems as described herein as well as to methods to store/release hydrogen by operating a reactor 2 as described herein and to store/release electrical energy by operating a system 13 as described herein. This aspect of the invention shall be explained in further detail below:

In one embodiment, the invention relates to a method for storing hydrogen, comprising the step of reducing a compound of formula (I) in a reactor as defined herein by feeding said reactor with a H$_2$-containing gas, thereby obtaining a reduced compound of formula (I) and water.

In one embodiment, the invention relates to a method for generating hydrogen, comprising the step of oxidizing a compound of formula (I) in a reactor as defined herein by feeding said reactor with water, thereby obtaining an oxidized compound of formula (I) and hydrogen.

In one embodiment, the invention relates to a method for storing electrical energy, said method comprising (a) electrolytically reducing water to obtain hydrogen; (b) reducing a compound of formula (I) in a reactor as defined herein by feeding said reactor with a hydrogen-containing gas obtained in step (a), thereby obtaining a H2O/H2 gaseous mixture; (c) separating H2 from said gaseous mixture and recycle said H2 into said reactor.

According to this invention, electrical energy is consumed by conversion to chemical energy in a hydrogen (H2) producing electrolyzer. The produced hydrogen is passed through a fixed bed reactor. The fixed bed consists of an iron based oxygen carrier in oxidized form (FeO$_x$, with 4/3≥x≥0). At elevated temperatures, the oxygen carrier is reduced by hydrogen, which produces steam (H$_2$O) and the oxygen carrier in reduced form (FeO$_y$, with y<x):

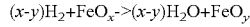
$(x-y)H_2+FeO_x \rightarrow (x-y)H_2O+FeO_y$

The stream leaving the reactor consists of unreacted hydrogen and steam. This stream is fed to a first separator, where steam is (partially) removed from the stream. The resulting stream has a higher hydrogen fraction H$_2$/(H$_2$O+H$_2$) and is fed back to the reactor.

In one embodiment, the invention relates to a method for releasing electrical energy, said method comprising (d) oxidizing a compound of formula (I) in a reactor as defined herein by feeding said reactor with water, thereby obtaining an oxidized compound of formula (I) and a H2O/H2 gaseous mixture, (e) separating H2 from said gaseous mixture and (f) electrochemically reduce hydrogen obtained in step (e) to obtain water and electrical energy.

According to this invention, water (in the form of steam) is passed through a fixed bed reactor. The fixed bed consists of an iron based oxygen carrier in reduced form (I'). At elevated temperatures, the oxygen carrier is oxidized by steam, which produces hydrogen and the oxygen carrier in oxidized form (I"):

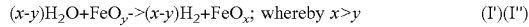
$(x-y)H_2O+FeO_y \rightarrow (x-y)H_2+FeO_x$; whereby $x>y$     (I')(I")

The stream leaving the reactor consists of unreacted steam and hydrogen. This stream is fed to a second separator, where it is split into a stream of higher hydrogen fraction and a stream of lower hydrogen fraction. The stream of lower hydrogen fraction is fed back to the reactor. The stream of higher hydrogen fraction is fed to a hydrogen consuming fuel cell, where chemical energy is converted to electrical energy. A stream of unconverted hydrogen leaves the fuel cell and can be fed to the second separator.

In one embodiment, the invention relates to the use of a reactor 2 as described herein (i) for converting hydrogen to water and storing the thus obtained energy by reducing a compound of formula (I) and/or (ii) for converting water to hydrogen by oxidizing a compound of formula (I) thereby releasing the previously stored energy.

In one embodiment, the invention relates to the use of a system 13 as described herein (i) for storing electrical energy, thereby charging said system; and/or for releasing electrical energy, thereby discharging said system. Preferably, the system is charged during a summer season using surplus energy from renewable energy sources and discharged during a winter season to make up for less production of renewable energy.

The above methods and uses are described in further detail by reference to the FIGS. 1, 2 and 3. In charging mode (FIG. 1A, 2A, 3A) electrical energy is used to produce hydrogen. The thus produced hydrogen is used to reduce a compound of formula (I). In discharging mode (FIG. 1B, 2B, 3B) water is reacted with the reduced compound of formula (I) to obtain an oxidized compound of formula (I) and hydrogen. The thus produced hydrogen is electrochemically oxidized to obtain electrical energy.

In FIG. 1A, the system is charged: A reversible fuel cell 1 connected with power supply 12a is fed with water through line 7 into inlet 1a, with air through inlet 1d. The thus produced hydrogen is fed to reactor inlet 2a. Within the reactor, the hydrogen is reacted with oxidized compound (I) to obtain reduced compound (I) along with a mixture H2/H2O. This mixture leaves reactor 2 through outlet 2b and enters separator 3 through inlet 3a. Water leaves the separator through outlet 3c and may be recycled 5 or discharged. The hydrogen leaves separator through outlet 3b. This H2 may be recycled via line 4 or otherwise used. In FIG. 1B, the system is discharged: Reactor 2 is fed with water through line 7 and inlet 2a. Within the reactor, the water is reacted with reduced compound (I) to obtain oxidized compound (I) along with a mixture H2/H2O. This mixture leaves reactor 2 through outlet 2b and enters separator 3 through inlet 3a. Water leaves the separator through outlet 3c and may be recycled via line 5 or discharged. The hydrogen leaves separator through outlet 3b. This hydrogen is fed to the reversible fuel cell 1 at the hydrogen inlet 1e. Within the reversible fuel cell, this hydrogen is reacted with air, entering from inlet 1d, to obtain water and electrical energy, which is provided at power output 12b for further use. Non-converted hydrogen may be recycled via line 6 to the separator 3.

In FIG. 2A, the system is charged: An electrolyzer 8 connected with power supply 12a is fed with water through line 7 into inlet 8a. The thus produced hydrogen is fed to reactor inlet 2a. Within the reactor, the hydrogen is reacted with oxidized compound (I) to obtain reduced compound (I) along with a mixture H2/H2O. This mixture leaves reactor 2 through outlet 2b and enters separator 3 through inlet 3a. Water leaves the separator through outlet 3c and may be recycled 5 or discharged. The hydrogen leaves separator through outlet 3b. This hydrogen may be recycled through line 4 or otherwise used.

In FIG. 2B, the system is discharged: Reactor 2 is fed with water through line 7 and inlet 2a. Within the reactor, the water is reacted with reduced compound (I) to obtain oxidized compound (I) along with a mixture H2/H2O. This mixture leaves reactor 2 through outlet 2b and enters separator 3 through inlet 3a. Water leaves the separator through outlet 3c and may be recycled via line 5 or discharged. The hydrogen leaves separator through outlet 3b. This hydrogen is fed to the fuel cell 9 at the hydrogen inlet 9b. Within the fuel cell, this hydrogen is reacted with air, entering from inlet 9a, to obtain water and electrical energy, which is provided at power output 12b for further use. Non-converted hydrogen may be recycled via line 6 to the separator 3.

In FIG. 3A, the system is charged: An electrolyzer 8 connected with power supply 12a is fed with water through line 7 into inlet 8a. The thus produced hydrogen is fed to reactor inlet 2a. Within the reactor, the hydrogen is reacted with oxidized compound (I) to obtain reduced compound (I) along with a mixture H2/H2O. This mixture leaves reactor 2 through outlet 2b and enters separator 10 through inlet 10a. Water leaves the separator through outlet 10c and may be recycled via line 5 or discharged. The hydrogen leaves separator through outlet 10b. This hydrogen may be recycled through line 4 or otherwise used.

In FIG. 3B, the system is discharged: Reactor 2 is fed with water through line 7 and inlet 2a. Within the reactor, the water is reacted with reduced compound (I) to obtain oxidized compound (I) along with a mixture H2/H2O. This mixture leaves reactor 2 through outlet 2b and enters separator 11 through inlet 11a. Water leaves the separator through outlet 11c and may be recycled via line 5 or discharged. The hydrogen leaves separator through outlet bib. This hydrogen is fed to the fuel cell 9 at the hydrogen inlet 9b. Within the fuel cell, this hydrogen is reacted with air, entering from inlet 9a, to obtain water and electrical energy, which is provided at power output 12b for further use. Non-converted hydrogen may be recycled via line 6 to the separator 11.

To further illustrate the invention, the following, non-limiting examples are provided.

Example 1

A single family house having a consumption of 5200 kWh electric energy per year is equipped with an inventive energy storage system.

General Equipment: For energy production the house is equipped with 79 square meters of photovoltaic panels (13.5 kWh peak power, estimated yearly production 12549 kWh). For seasonal energy storage, the electric energy storage system according to this invention (975 kWh net capacity, estimated to consume 3740 kWh electricity per year) is installed as further described below. For short term energy storage, a rechargeable battery is installed (48 kWh Flex Storage P, VARTA Storage GmbH).

Energy Storage System: The energy storage reactor has cylindrical shape, an inner diameter of 1.35 m, and an inner length of 1.35 m. The reactor vessel consists of stainless steel (1.4404/316L) and flat sealing rings consist of expanded graphite (Novaphit SSTC, Angst+Pfister AG). The reactor is thermally insulated using rock wool (Flumroc FMI-500 FP Alum, Indisol AG). The reactor vessel is charged with 24.8 kmol FeOx in the form of goethite (Bayferrox 3920, Lanxess AG).

The gas leaving the reactor is cooled in a bundle heat exchanger (M&C TechGroup Germany GmbH). Condensed water leaves the heat exchanger through condensate drain (M&C TechGroup Germany GmbH). The gas leaving the heat exchanger passes a back pressure regulator (Swagelock), that keeps the pressure at the outlet of the heat exchanger at 1.05 bar abs. The gas passing the pressure is facilitated back to the reactor vessel by means of a pump (N 186.1.2 ST.9 E Ex, KNF Neuberger AG).

For safety reasons, the reactor is equipped with four low pressure regulators: two for prevention of overpressure (1.5 bar abs, ZM-B type, Zimmerli Messtechnik AG) and two for prevention of underpressure (0.8 bar abs, ZM-R type, Zimmerli Messtechnik AG). The underpressure pressure regulators are connected to a source of pressurized nitrogen and the overpressure regulators are connected to a safe outlet.

The fixed bed is heated internally by multiple internal tubular heating elements (RPT, K. Mösch AG). The temperature within the fixed bed is measured at multiple locations J-type thermocouples. Additionally, the temperature of the reactor jacket and caps is measured at multiple locations using K-type surface thermocouples.

Charging: During the period from March to October 4572 kWh of surplus photovoltaic energy is produced. This energy is converted in two electrolyzers (QL 2000, Fuel Cell Store, assumed efficiency of 45% w.r.t. H2-HHV) to 52.9 kg of hydrogen, which is used to charge the energy storage reactor.

Discharging: During the period from November-February 962 kWh of energy shortage are compensated by discharging 52.5 kg hydrogen from the energy storage reactor and converting it in two fuel cells (Horizon H-500 PEM Fuel Cell, Fuel Cell Store, assumed efficiency of 55% w.r.t. H2-LHV).

Conclusion: The system is safely operated and reduces the amount of external energy required.

Example 2

A residential building having an electric energy consumption of about 10400 kWh per year is equipped with an inventive energy storage system.

General Equipment: For energy production the house is equipped with about 150 square meters of photovoltaic panels (about 25 kW peak power, estimated yearly production about 25500 kWh). For seasonal energy storage, the electric energy storage system according to this invention is installed as further described below. It has a net electric energy storage capacity of about 1800 kWh and consumes about 16900 kWh of electric energy per year (electrolyzer included). For short term energy storage, a rechargeable battery is installed.

Energy Storage System: The energy storage reactor has cylindrical shape, a diameter of about 1.6 m, and a length of about 1.8 m. The reactor vessel consists of stainless steel (1.4571/316Ti). Flat sealing rings consist of expanded graphite. The reactor is thermally insulated using rock wool. The reactor vessel is charged with iron oxide containing about 52 kmol Fe in total. On top of the iron oxide, rock wool (Flumroc®, Flumroc AG) is deposited in a compressed form thereby taking over the function of a compensation element.

A heat exchanger is used to transfer heat from the fluid leaving the reactor to the fluid entering the reactor.

A gas cooler is used to further cool the cooled fluid leaving the heat exchanger. Condensed water leaves the heat exchanger through a condensate drain.

During charging, the gas leaving the gas cooler is facilitated back to the reactor vessel by means of a gas pump. During discharging the gas leaving the gas cooler is fed to the fuel cell.

For safety reasons, the reactor is equipped with four safety valves: two for prevention of overpressure and two for prevention of underpressure. The underpressure regulators are connected to a source of pressurized nitrogen and the overpressure regulators are connected to a safe outlet.

The reactor vessel is heated externally by multiple heating bands and the surface temperature of the reactor is measured at multiple locations.

Charging: During the period from March to October about 8500 kWh of surplus photovoltaic energy is produced. This energy is converted in two electrolyzers (efficiency of about 50% w.r.t. H2-HHV) to about 110 kg of hydrogen, which is used to charge the energy storage reactor.

Discharging: During the period from November to February about 1800 kWh of energy shortage are compensated by discharging about 110 kg hydrogen from the energy storage reactor and converting it in two fuel cells (efficiency of about 50% w.r.t. H2-LHV).

Heat integration: The energy storage system is located in the basement of the building. During the period from November to February the system provides about 2000 kWh of heat at about 25° C. to the heating system of the house and the fuel cell provides about 1800 kWh of heat at about 60° C., which is recovered in water.

Conclusion: The system is safely operated and reduces the amount of external energy required. Electric energy produced by photovoltaic panels is stored during the period from March to October. Electric energy and heat are released during the period from November to February. Heat integration decreases the amount of energy required for heating the building and production of warm water during the discharging period.

Example 3

A. Experimental Setup

An energy storage system according to this invention (a "pilot") was built and operated. The system contained a thermally insulated energy storage reactor according to this invention, a feed for hydrogen and nitrogen, a feed for water, a gas cooler equipped with a condensate drain, a gas purge, a gas recycle system, and a process control software.

Reactor: The cylindrical stainless steel (1.4404/316 L) reactor vessel had an inner diameter of 398 mm, an inner height of 1200 mm, and an inner volume of approximately 150 liters. The flat top and bottom cover (10 mm thickness) of the reactor were joined to the jacket (4 mm thickness) by flange connections equipped with flat sealing rings (NOVAPHIT SSTC/PASSO3, 1.5 mm thickness, Angst+ Pfister AG). For safety reasons, the reactor was equipped with four low pressure regulators: two for prevention of overpressure (+500 mbar, ZM-B type, Zimmerli Messtechnik AG) and two for prevention of underpressure (−200 mbar, ZM-R type, Zimmerli Messtechnik AG). The inlets of the underpressure pressure regulators were connected to a source of pressurized nitrogen and the inlets of the overpressure regulators were connected to a safe outlet.

The reactor was equipped with a gas inlet at the top, a water inlet at the top and an outlet at the bottom.

The reactor was heated internally as follows: The top cover of the reactor was equipped with 8 stainless steel tubes (outer diameter 6.35 mm, wall thickness 0.89 mm). These steel tubes (about 1 m length) ranged into the reactor and were sealed at their ends. Into each tube, one tubular heating element (RPT 4×1150 mm 630 W 230V, heated length 1000 mm, Fe—CuNi thermocouple, K. Mösch AG), was inserted. Four independent heating segments were built, each consisting of two serially connected heating elements. Thus, the maximum power output of a heating segment was 315 W and the maximum power of the entire heating system was 1260 W.

The temperature within the reactor was measured at multiple locations using 8 J-type thermocouples. The temperature of the reactor jacket, top cover, and bottom cover was measured at 14 locations using K-type thermocouples.

The reactor was thermally insulated by covering it on all sides with around 15-25 cm of rockwool (Flumroc FMI-500 FP Alu, Indisol AG).

Hydrogen and Nitrogen Feed: Hydrogen (5.0, Pangas) was supplied at approx. 1.5 bar abs. to a hydrogen mass flow controller (EL-FLOW Select, Bronkhorst AG). Nitrogen (5.0, Pangas) was supplied at approx. 1.5 bar abs. to a nitrogen mass flow controller (5850EM, Brooks Instrument). The outlet of both mass flow controllers was combined in a first tee and was fed to a forward pressure reducing valve (Swagelok), which was set to 1.0-1.3 bar abs. The gas passing this pressure reducing valve was combined in a second tee with the recycled gas stream. This gas stream was piped to the gas inlet of the reactor.

Water feed: Deionised water (ETH Zürich) was pumped (ISMATEC REGLO-Z Digital, Cole-Parmer GmbH) through a heated (400 W, ETH Zurich) steel tube. Water leaving this evaporator was piped to the water inlet of the reactor.

Gas cooler with condensate drain: The outlet of the reactor was connected to a water-cooled tube bundle heat exchanger (LGT 2, M&C TechGroup Germany GmbH) equipped with an automatic condensate drain (ADS-SS, M&C TechGroup Germany GmbH). Condensate water was collected in a bottle. Via a hydrogen mass flow meter (EL-Flow Select, Bronkhorst AG), the cooled gas was piped to a third tee. The mass flow meter was used to measure the flow of gas being purged or recycled.

Purge: The first outlet of the third tee was equipped with a needle valve, which could be opened, to release gas to a safe outlet.

Gas Recycle: The second outlet of the third tee was part of the gas recycle, which further consisted of a needle valve, a solenoid valve (Type 6240, Bürkert Schweiz AG), a gas pump (N 026.1.2 ST.9 E Ex, KNF Neuberger AG), and the inlet of the second tee. Using digital manometers (Keller AG), the pressure in the system was monitored at the top of the reactor and at the gas outlet of the gas cooler.

B. Operation

The reactor was filled to the top with 75 kg FeOx in the form of goethite (Bayferrox 3920, Lanxess AG). Cooling water was supplied to the gas cooler (50 L/h, water temperature 10-12° C.) at all times. Given the internal heating system, only the core of the fixed bed (65% of inner diameter, 88% of inner height) was hot enough to be converted to iron, whereas the remaining goethite was only reduced to magnetite and served as thermal insulation within the reactor.

Charging 1: Initially, the gas atmosphere in the reactor was changed from air to nitrogen and the set temperature of the heating elements was raised to 200° C. during 5 days. Then the gas atmosphere in the reactor was changed from nitrogen to hydrogen. In the following, the temperature was changed as follows:

| Time [days] | Set Temp Reactor [° C.] | Time [days] | Set Temp Reactor [° C.] |
|---|---|---|---|
| 5.01 | 200 | 47.80 | 340 |
| 27.75 | 220 | 53.76 | 380 |
| 32.79 | 240 | 68.02 | 400 |
| 39.67 | 260 | 90.24 | 380 |
| 42.86 | 300 | 92.69 | 380 |

Discharging 1: Discharging 1 started after 92.7 days and ended after 102.9 days. During that time the following 11 runs were conducted, differing in their duration, the set temperature (of the reactor), the set temperature of the evaporator, and the setting of the water pump.

| Run # | Start Time [days] | Duration [h] | Set Temp. Reactor [° C.] | Set Temp. Evaporator [° C.] | Setting Water Pump [—] |
|---|---|---|---|---|---|
| 1 | 92.75 | 5.37 | 380 | 200 | 5 |
| 2 | 95.71 | 7.89 | 310 | 200 | 3 |
| 3 | 96.04 | 0.22 | 310 | 120 | 3 |
| 4 | 96.05 | 19.29 | 305 | 120 | 3 |
| 5 | 96.86 | 4.27 | 305 | 150 | 5 |
| 6 | 97.04 | 6.38 | 265 | 150 | 3 |
| 7 | 98.73 | 2.35 | 300 | 150 | 5 |
| 8 | 98.83 | 2.38 | 300 | 150 | 7 |
| 9 | 98.93 | 1.37 | 300 | 200 | 10 |
| 10 | 98.99 | 0.33 | 300 | 200 | 3 |
| 11 | 99.02 | 15.62 | 300 | 200 | 3 |

Charging 2: The second charging procedure was started after 102.9 days at a set reactor temp. of 200° C. The temperature was increased with a heating ramp to 380° C. This procedure ended after 117.8 days at a set temp. of 320° C.:

| Time [days] | Set Temp Reactor [° C.] | Time [days] | Set Temp Reactor [° C.] |
|---|---|---|---|
| 102.94 | 200 | 117.23 | 380 |
| 103.01 | 200 | 117.23 | 320 |
| 103.04 | 200 | 117.82 | 320 |
| 103.16 | 380 | | |

Discharging 2: Discharging 2 started after 117.8 days and ended after 120.0 days. During that time the following 7 runs were conducted, differing in their duration, the set temperature (of the reactor), and the setting of the water pump:

| Run # | Start Time [days] | Duration [h] | Set Temp. Reactor [° C.] | Set Temp. Evaporator [° C.] | Setting Water Pump [—] |
|---|---|---|---|---|---|
| 1 | 117.84 | 0.19 | 320 | 200 | 3 |
| 2 | 117.84 | 0.14 | 320 | 200 | 5 |
| 3 | 117.85 | 0.38 | 320 | 200 | 9 |
| 4 | 117.87 | 7.99 | 320 | 200 | 12 |
| 5 | 118.62 | 9.33 | 280 | 200 | 10 |
| 6 | 119.01 | 24.70 | 280 | 200 | 8 |
| 7 | 120.04 | 13.19 | 280 | 200 | 7 |

C. Results

The state of charge of the energy storage system was determined from a water balance. In detail, the mass of water collected at the condensate drain minus the mass of water fed to the evaporator and minus the mass of water deriving from the initial conversion of goethite to magnetite (10.08 kg) yields the net amount of water. This net amount of water is proportional to the state of charge. Thus, 0% charge corresponded to 0 kg of net water and 100% charge corresponded to about 7.5 kg of net water, which is the full conversion of the hot core to iron. The following table shows the net amount of water after charging/discharging and the state of charge.

| | Net Water [kg] | State of Charge |
|---|---|---|
| Before Charging 1 | −10.1 | |
| After Charging 1 | 4.14 | 54.8% |
| After Discharging 1 | 0.26 | 3.4% |
| After Charging 2 | 5.88 | 78.0% |
| After Discharging 2 | 0.36 | 4.7% |
| After Charging 3 | 5.98 | 79.2% |
| After Discharging 3 | 0.35 | 4.7% |

D. Conclusion

A pilot of an energy storage system was built and operated safely and at low pressure. During the second and the third cycle the net amount of water changed about 5.5 kg, which corresponds to about 600 g of hydrogen.

The above data also indicate stability of the system in regards of charging/discharging.

The invention claimed is:

1. A reactor comprising
a reaction vessel defining an inner volume,
a compensation element,
an inlet and an outlet,
a heating element,
an insulation,
wherein
said inner volume is filled with a fixed bed;
said fixed bed contains or consists of particles of formula (I), $FeO_x$ (I), where $0 \leq x \leq 1.5$; and
said fixed bed is free of cavities having a volume larger than 10000 mm$^3$ and having principal radii that are at least 3 mm long, said principal radii being the three principal radii of the biggest ellipsoid that fits into the cavity;
said compensation element is adapted to adjust said inner volume.

2. The reactor according to claim 1, wherein the reaction vessel
defines an inner volume of 1-10 m$^3$; and/or
is in the form of a cylinder or a sphere or a tube bundle; and/or
does not contain means for agitation or transportation.

3. The reactor according to claim 1, wherein said compensation element
is adapted to compensate volume dilatation/compression during operation of the reactor; and/or
is configured in the form of a membrane or in the form of a piston or in the form of a sponge or in the form of a fibrous material.

4. The reactor according to claim 1, wherein the inlet and outlet
are adapted to fill and remove gases from said inner volume;
are adapted to retain particulate material within the reactor; and/or
are at the top (inlet) and bottom (outlet) of the reactor.

5. The reactor according to claim 1, further comprising one or more of the following elements:
a gas tank in fluid communication with said reaction vessel (containing an inert gas) to adjust gas pressure and volume during operation.

6. An energy storage system comprising
a reactor according to claim 1, said reactor being in fluid communication with
a unit operating as a reversible fuel cell,
a unit separating water from hydrogen.

7. The system according to claim 6, wherein said reversible fuel cell is replaced by an electrolyzer and a fuel cell, said electrolyzer being in fluid communication with said reactor, said fuel cell being in fluid communication with said separating unit.

8. The system according to claim 6, where said separating unit is replaced by two separating units, for charging and discharging mode.

9. The system according to claim 6, further comprising a microporous and hygroscopic material containing chamber within the reactor.

10. A method for storing hydrogen, comprising the step of reducing a compound of formula (I) in a reactor as defined in claim 1 by feeding said reactor with a hydrogen-containing gas, thereby obtaining a reduced compound of formula (I) and water.

11. A method for generating hydrogen, comprising the step of oxidizing a compound of formula (I) in a reactor as defined in claim 1 by feeding said reactor with water, thereby obtaining an oxidized compound of formula (I) and hydrogen.

12. A method for storing electrical energy, said method comprising:
 (a) electrolytically reducing water to obtain hydrogen;
 (b) reducing a compound of formula (I) in a reactor as defined in claim 1 by feeding said reactor with a hydrogen-containing gas, thereby obtaining a $H_2O/H_2$ gaseous mixture;
 (c) separating $H_2$ from said gaseous mixture and recycle said $H_2$ into said reactor.

13. A method for releasing electrical energy, said method comprising:
 (d) oxidizing a compound of formula (I) in a reactor as defined in claim 1 by feeding said reactor with water, thereby obtaining an oxidized compound (I) and a $H_2O/H_2$ gaseous mixture,
 (e) separating $H_2$ from said gaseous mixture, and
 (f) electrochemically reduce $H_2$ to obtain water and electrical energy.

* * * * *